(12) United States Patent
Uemura

(10) Patent No.: US 6,202,663 B1
(45) Date of Patent: Mar. 20, 2001

(54) STICK-USED STAGELESS ADJUSTING DEVICE

(75) Inventor: Shinichi Uemura, Nagoya (JP)

(73) Assignee: Crystal Industrial Co., Ltd., Nagaoma (JP)

(*) Notice: Subject to any disclaimer, the term of this patent is extended or adjusted under 35 U.S.C. 154(b) by 0 days.

(21) Appl. No.: 09/369,888

(22) Filed: Aug. 9, 1999

(51) Int. Cl.$^7$ ........................................................ A45B 1/00
(52) U.S. Cl. ............................ 135/65; 135/75; 403/104; 403/109.5
(58) Field of Search ........................... 135/65, 69, 75; 403/104, 110, 109.1, 109.5

(56) References Cited

U.S. PATENT DOCUMENTS

| | | | |
|---|---|---|---|
| 2,455,525 | * 12/1948 | Schulz | 403/104 X |
| 2,456,205 | * 12/1948 | Magder | 403/104 X |
| 2,947,556 | * 8/1960 | Wenger | 403/104 X |
| 4,134,703 | * 1/1979 | Hinners | 403/104 |
| 4,151,853 | * 5/1979 | Inbar | 403/104 X |
| 4,154,545 | * 5/1979 | Pinto et al. | 403/104 |
| 4,896,687 | * 1/1990 | Segal et al. | 403/109.5 X |
| 4,948,149 | * 8/1990 | Lin et al. | 403/104 X |
| 5,011,104 | * 4/1991 | Fang | 403/104 X |
| 5,769,104 | * 6/1998 | Uemura | 135/75 X |
| 5,867,147 | * 3/1999 | Longo | 403/109.5 |

* cited by examiner

Primary Examiner—Laurie K. Cranmer
(74) Attorney, Agent, or Firm—Bacon & Thomas

(57) ABSTRACT

A stick-used stageless adjusting device for both left-handed and right-handed users to conveniently adjust the length of the stick. The stick is formed by an upper fitting tube and a lower fitting tube fitted into the upper fitting tube. The stageless adjusting device is disposed at top end of the lower fitting tube and includes a movable body and a brake body. The movable body includes two conic bodies and a thread rod connected between the conic bodies. The conic faces of the conic bodies are opposite to each other. The brake body is formed with an annular groove on outer circumference for a rubber ring to insert therein and composed of two semi-cylindrical halves. Each half is disposed with a thread for screwing with the thread rod of the movable body. When counterclockwise or clockwise rotating the lower fitting tube, the two halves of the brake body are outward stretched by the conic faces of the conic bodies to lean against the inner circumferential wall face of the upper fitting tube so as to firmly fix the lower fitting tube with the upper fitting tube.

5 Claims, 6 Drawing Sheets

STICK-USED STAGELESS ADJUSTING DEVICE

BACKGROUND OF THE INVENTION

The present invention relates to a stick-used stageless adjusting device for both left-handed and right-handed users to conveniently adjust the length of the stick.

Japanese Patent Publication No. ¥7-49004 discloses a stick-used stageless adjusting device. The stageless adjusting device includes a movable body integrally disposed at top end of the lower fitting tube of the stick. The movable body has a central conic body having a circumferential conic face. A resilient cylindrical brake body and an eccentrically rotatable circular board are screwed with outer circumference of the movable body. When rotating the lower fitting tube, the circular board is pressed against the inner circumferential wall face of the upper fitting tube. Also, the brake body is outward stretched by the conic body of the movable body to lean against the inner circumferential wall face of the upper fitting tube so as to adjustably fix the upper fitting tube with the lower fitting tube.

The above stageless adjusting device has complicated structure and is manufactured at high cost. Moreover, the circular board tends to detach from the brake body. This often leads to failure of the adjusting device.

In addition, when tightly fixing the upper fitting tube with the lower fitting tube, the lower fitting tube must be rotated in a fixed direction which is generally designed for a right-handed user. Therefore, for a left-handed user, it is inconvenient to use such stick.

SUMMARY OF THE INVENTION

It is therefore a primary object of the present invention to provide a stick-used stageless adjusting device in which the lower fitting tube can be rotated in both clockwise and counterclockwise direction to be fixed with the upper fitting tube. Therefore, for both left-handed and right-handed users, the stick can be conveniently used and adjusted in length.

The present invention can be best understood through the following description and accompanying drawings wherein:

DETAILED DESCRIPTION OF THE PREFERRED EMBODIMENT

Figure 1:
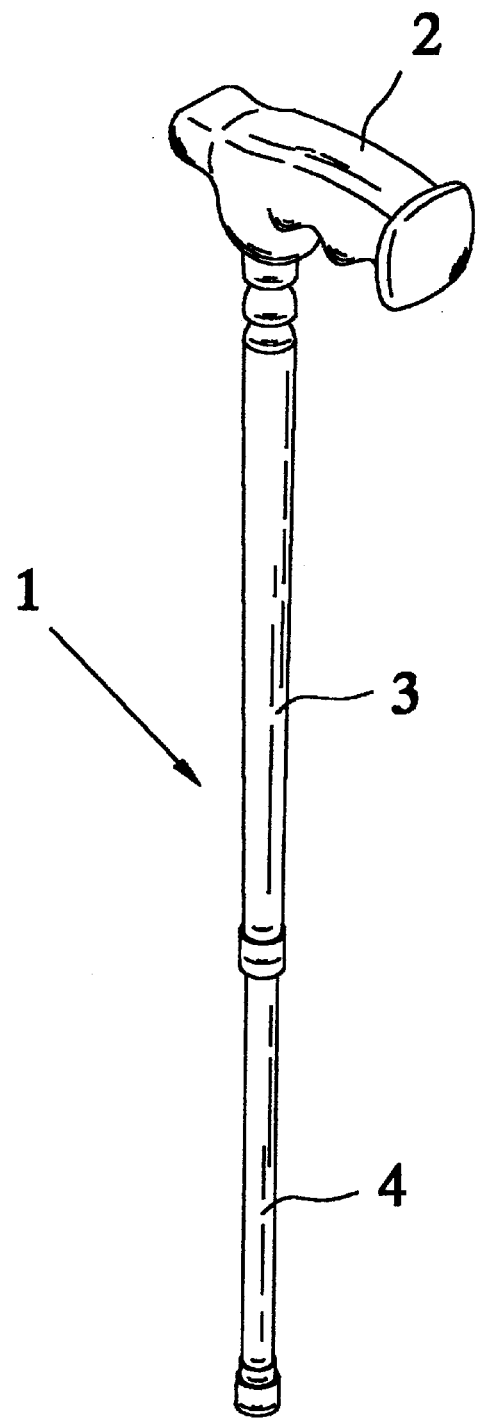
FIG. 1 is a perspective view of the stick of the present invention.

Please refer to FIG. 1. The stageless adjusting device of the present invention is mounted in a stick 1. The stick 1 is disposed with a grip section 2 at top end and an upper fitting tube 3 made of light alloy and downward extending from the grip section 2. A lower fitting tube 4 is coaxially fitted into the lower end of the upper fitting tube 3 to form the stick 1. The stageless adjusting device of the present invention is disposed on the top edge of the lower fitting tube 4.

Figure 2:
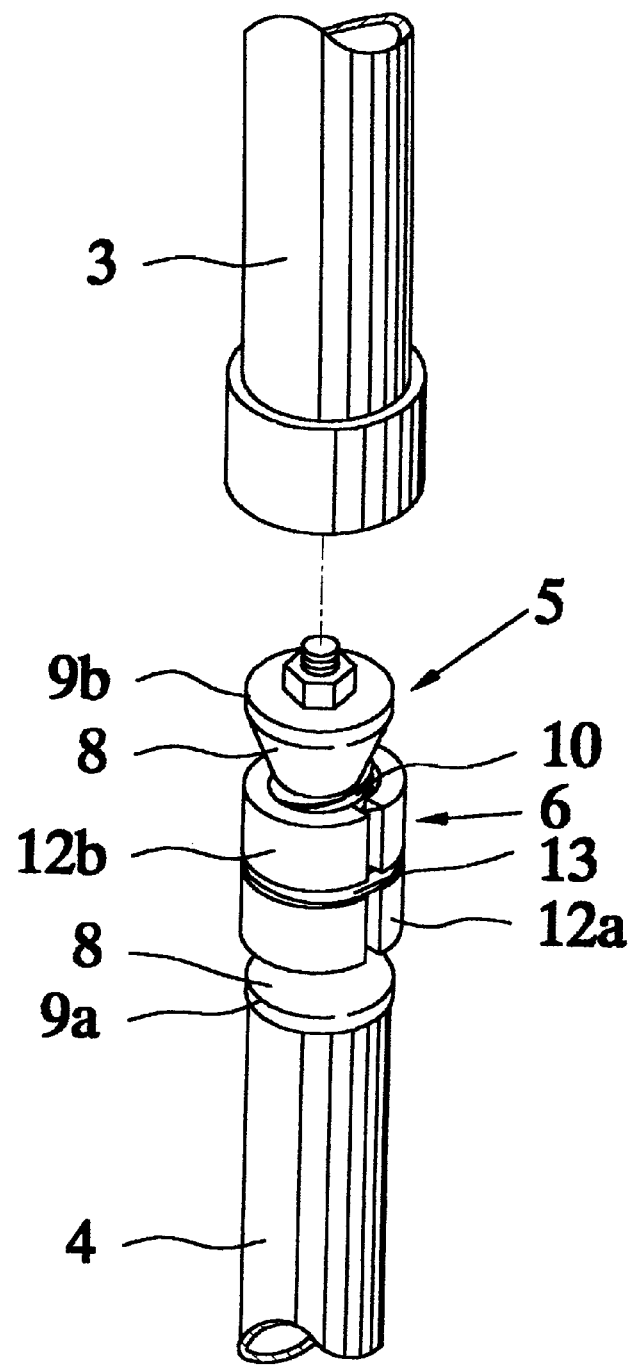
FIG. 2 is a perspective assembled view of the present invention.
Figure 3:
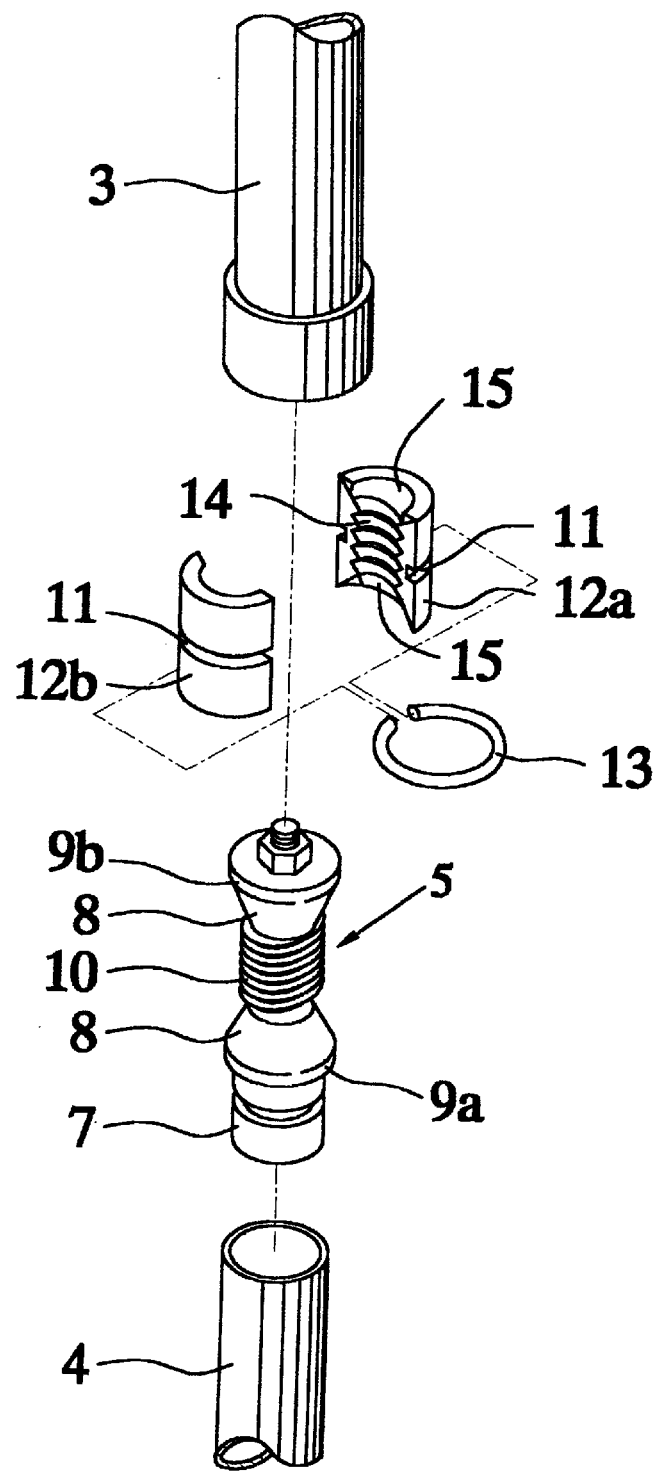
FIG. 3 is a perspective exploded view of the present invention.

Please refer to FIGS. 2 and 3. The stageless adjusting device includes a movable body 5 and a brake body 6. Two conic sections 9a, 9b are disposed at two ends of the movable body 5 with their conic faces 8 opposite to each other. A thread rod 10 is connected between the two conic sections 9a, 9b. In addition, a cylindrical insertion section 7 is integrally connected with lower end of the conic section 9a. The brake body 6 is formed with an annular groove 11 on outer circumference for a C-shaped rubber ring 13 to insert therein. The brake body 6 is composed of two semi-cylindrical halves 12a, 12b mated with each other and made of synthetic resin. The inner circumferential wall of each of the semicylindrical halves 12a, 12b is disposed with a thread 14 for screwing with the thread rod 10 of the movable body 5. An upper and a lower sides of the thread 14 are formed with slope faces 15 for attaching to the conic faces 8 of the conic bodies 9a, 9b.

When assembled, the brake body 6 is screwed with the thread rod 10 and the lower fitting tube 4 is inserted into the upper fitting tube 3 with the outer circumferences of the semicylindrical halves 12a, 12b of the brake body 6 slightly contact with the inner wall face of the upper fitting tube 3.

Figure 4:
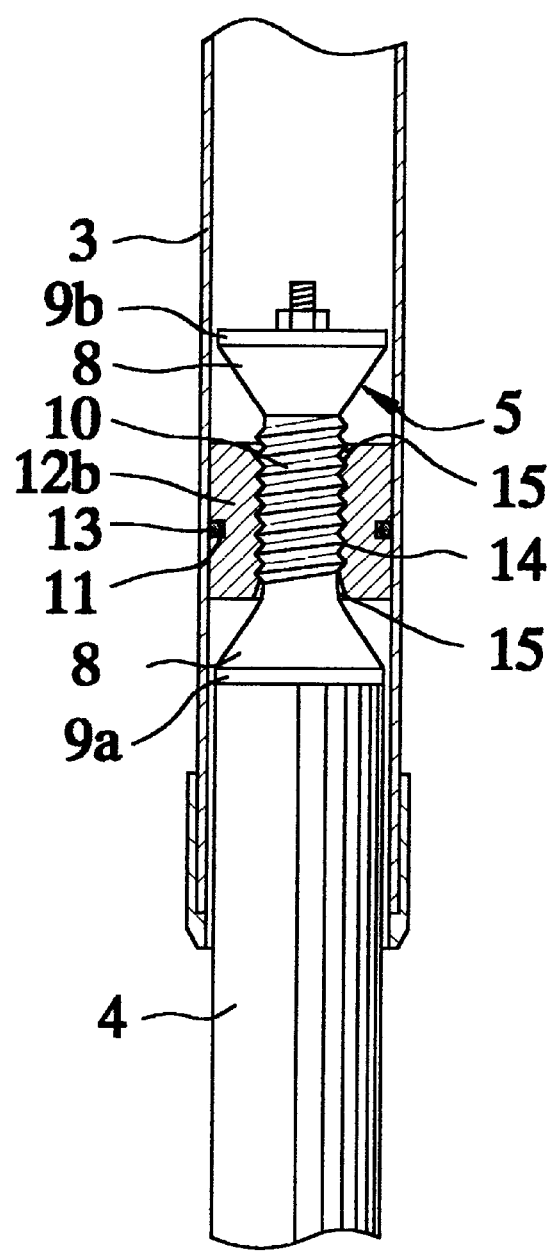
FIG. 4 is a sectional view of a part of the present invention.
Figure 5:
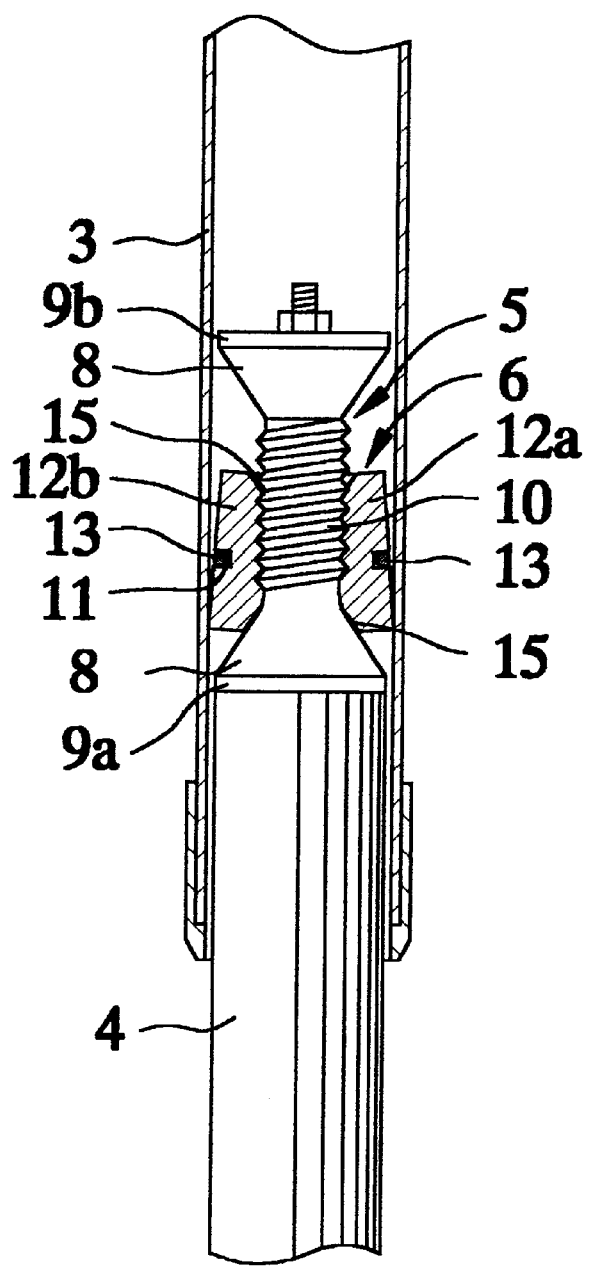
FIG. 5 is a sectional view showing that the lower fitting tube of the present invention is counterclockwise rotated.

Referring to FIG. 4, in the case that the brake body 6 is screwed with the movable body 5 at a middle position of the thread rod 10, the lower fitting tube 4 can be freely moved within the upper fitting tube 3 so as to adjust the length of the stick. In use, for a right-handed user, the upper fitting tube 3 is held by left hand and the lower fitting tube 4 is held by right hand and counterclockwise rotated to make the semicylindrical halves 12a, 12b contact with the upper fitting tube 3 and make the lower fitting tube 4 and thread rod 10 ascend as shown in FIG. 5. At this time, the two semicylindrical halves 12a, 12b of the brake body 6 are gradually outward stretched by the conic face of the lower conic body 9a below the thread rod 10. The C-shaped rubber ring 13 disposed around the halves 12a, 12b serves to restrict the halves 12a, 12b and resist against the stretching force. At this time, the two semicylindrical halves 12a, 12b are stretched to lean against the inner wall face of the upper fitting tube 3 so as to firmly fix the lower fitting tube 4 with the upper fitting tube 3.

Figure 6:
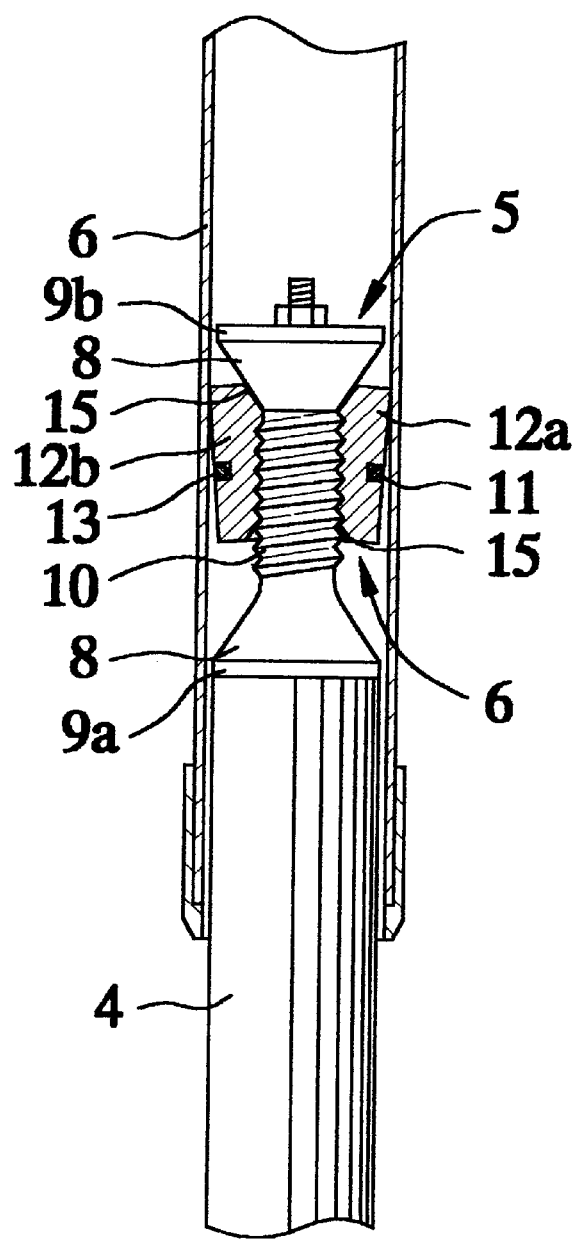
FIG. 6 is a sectional view showing that the lower fitting tube of the present invention is clockwise rotated.

Similarly, for left-handed user, the upper fitting tube 3 is held by right hand and the lower fitting tube 4 is held by left hand and clockwise rotated. At this time, the thread rod 10 fixed with the lower fitting tube 4 will gradually descend as shown in FIG. 6. At this time, the two semicylindrical halves 12a, 12b of the brake body 6 are gradually outward stretched by the conic face 8 of the upper conic body 9b above the thread rod 10. The C-shaped-rubber ring 13 disposed around the halves 12a, 12b serves to resist against the stretching force exerted onto the two halves 12a, 12b. At this time, the two semicylindrical halves 12a, 12b are stretched to lean against the inner wall face of the upper fitting tube 3 so as to firmly fix the lower fitting tube 4 with the upper fitting tube 3.

According to the above arrangement, by means of holding and rotating the lower fitting tube 4 with one hand, the length of the stick can be easily adjusted. This can be performed by both right-handed or left-handed users. Such adjusting device has simple structure and can be easily assembled.

The above embodiment is only used to illustrate the present invention, not intended to limit the scope thereof. Many modifications of the above embodiment can be made without departing from the spirit of the present invention.

What is claimed is:

1. An adjustable stick device comprising an upper fitting tube and a lower fitting tube fitted into the upper fitting tube, a stageless adjusting device being disposed at the top end of the lower fitting tube and comprising a movable body and a brake body, the movable body including upper and lower frusto conical bodies, each of said bodies having a major and minor circular base; and a threaded rod connected between the conic bodies, the minor circular bases of the conic bodies being opposite to each other, a cylindrical insertion section being disposed at the major base of the lower frusto conical body, the brake body being cylindrical and having an annular groove on the outer circumference for a rubber ring to insert therein, each half of said brake body being disposed with a thread for screwing with the threaded rod of the movable body, whereby when counter clockwise or clockwise rotating the lower fitting tube, the two halves of the brake body are outwardly expanded by the conic minor bases of the frusto conical bodies to press against the inner circumferential wall of the upper fitting tube so as to firmly fix the lower fitting tube with the upper fitting tube.

2. The adjustable stick device of claim 1, fitted with a grip on the distal end of the upper fitting tube.

3. The adjustable stick device of claim 1, wherein the upper and lower fitting tubes are made of a light weight alloy.

4. The adjustable stick device of claim 3, wherein the two halves of the brake device are mated and made of a synthetic resin.

5. The adjustable stick device of claim 4, wherein the two halves of the brake device slightly contact the inner wall of the upper fitting tube.

* * * * *